US012136170B2

(12) United States Patent
Takagi et al.

(10) Patent No.: US 12,136,170 B2
(45) Date of Patent: Nov. 5, 2024

(54) INFORMATION MANAGEMENT DEVICE, INFORMATION MANAGEMENT METHOD, AND STORAGE MEDIUM

(71) Applicant: HONDA MOTOR CO., LTD., Tokyo (JP)

(72) Inventors: Satomi Takagi, Tokyo (JP); Takashi Ohta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 265 days.

(21) Appl. No.: 17/702,826

(22) Filed: Mar. 24, 2022

(65) Prior Publication Data

US 2022/0309750 A1   Sep. 29, 2022

(30) Foreign Application Priority Data

Mar. 29, 2021 (JP) .................................. 2021-054888

(51) Int. Cl.
*G06T 17/20* (2006.01)
*G06T 19/20* (2011.01)
*H04W 4/02* (2018.01)

(52) U.S. Cl.
CPC ............ *G06T 17/205* (2013.01); *G06T 19/20* (2013.01); *H04W 4/025* (2013.01); *G06T 2219/2004* (2013.01)

(58) Field of Classification Search
CPC ........ G06T 17/205; G06T 17/30; G06F 30/12
See application file for complete search history.

(56) References Cited

U.S. PATENT DOCUMENTS

| 2012/0101727 A1* | 4/2012 | Mays ................... G01C 21/206 |
| | | 701/533 |
| 2014/0368521 A1* | 12/2014 | Lassen .................. G06T 15/005 |
| | | 345/530 |
| 2021/0049901 A1* | 2/2021 | Young ..................... H04W 4/46 |
| 2021/0180981 A1* | 6/2021 | Matsumoto ........ G01C 21/3815 |

FOREIGN PATENT DOCUMENTS

| JP | 2007-071579 | 3/2007 |
| JP | 2020-038362 | 3/2020 |
| JP | 2001-093077 | 4/2021 |

OTHER PUBLICATIONS

Japanese Office Action for Japanese Patent Application No. 2021-054888 mailed Aug. 27, 2024.

* cited by examiner

*Primary Examiner* — Phuc N Doan

(74) *Attorney, Agent, or Firm* — Amin, Turocy & Watson, LLP

(57) ABSTRACT

Provided is an information management device, comprising a storage medium storing a computer-readable instruction and a processor coupled to the storage medium, the processor executing the computer-readable instruction to: acquire, from a mobile object, uploaded information associated with position information on the mobile object; generate mesh information based on the uploaded information; and store the mesh information into a storage in association with a mesh region including the position information on the mobile object among a plurality of mesh regions defined so as to delimit a ground region.

10 Claims, 13 Drawing Sheets

FIG. 3

| TIME | LONGITUDE | LATITUDE | TRAVELED DISTANCE | SPEED | ACCELERATION/ DECELERATION | SP | POWER CONSUMPTION | 162 |
|---|---|---|---|---|---|---|---|---|
| t1 | XX° XX' XX. | XX° XX' XX. | D1km | V1km/h | ACCELERATION | D | X1Wh | ... |
| t2 | XX° XX' XX. | XX° XX' XX. | D2km | V2km/h | ACCELERATION | D | X2Wh | ... |
| t3 | XX° XX' XX. | XX° XX' XX. | D3km | V3km/h | DECELERATION | D | X3Wh | ... |
| t4 | XX° XX' XX. | XX° XX' XX. | D4km | V4km/h | ACCELERATION | D | X4Wh | ... |
| ... | ... | ... | ... | ... | ... | ... | ... | ... |

FIG. 4

| MESH ID | Ne COORDINATE | Se COORDINATE | Nw COORDINATE | Sw COORDINATE |
|---|---|---|---|---|
| 10001 | (x1, y1) | (x2, y2) | (x3, y3) | (x4, y4) |
| 10002 | (x2, y2) | (x5, y5) | (x4, y4) | (x6, y6) |
| 10003 | (x7, y7) | (x8, y8) | (x1, y1) | (x2, y2) |
| 10004 | (x8, y8) | (x9, y9) | (x2, y2) | (x5, y5) |
| ... | ... | ... | ... | ... |

| MESH ID | INPUT MESH ID_1 | OUTPUT MESH ID_1 | MOVEMENT DIRECTION_1 | INPUT MESH ID_2 | OUTPUT MESH ID_2 | MOVEMENT DIRECTION_2 | TRAVELED DISTANCE | SPEED | ACCELERATION/ DECELERATION | SP | POWER CONSUMP-TION | TYPE |
|---|---|---|---|---|---|---|---|---|---|---|---|---|
| 10001 | 10002 | 10003 | NE | — | — | — | ●● | V3 | DECELERATION | D | ●● | LINK |
| 10002 | 10005 | 10001 | N | — | — | — | ●● | (V1+V2)/2 | ACCELERATION | D | ●● | LINK |
| 10003 | 10001 | 10006 | NE | — | — | — | ●● | V4 | ACCELERATION | D | ●● | LINK |
| 10004 | — | — | — | — | — | — | ⋮ | — | — | — | — | — |
| ⋮ | ⋮ | ⋮ | ⋮ | ⋮ | ⋮ | ⋮ | ⋮ | ⋮ | ⋮ | ⋮ | ⋮ | ⋮ |

| MESH ID | INPUT MESH ID _1 | OUTPUT MESH ID _1 | MOVEMENT DIRECTION _1 | INPUT MESH ID _2 | OUTPUT MESH ID _2 | MOVEMENT DIRECTION _2 | AVERAGE TRAVELED DISTANCE | AVERAGE SPEED | ACCELERATION/ DECELERATION | SP | POWER CONSUMP- TION | TYPE |
|---|---|---|---|---|---|---|---|---|---|---|---|---|
| 10001 | 10002 | 10003 | NE | - | - | - | ●● | ●● | DECELERATION | D | ●● | LINK |
| 10002 | 10005 | 10001 | N | - | - | - | ●● | ●● | ACCELERATION | D | ●● | LINK |
| 10003 | 10001 | 10006 | NE | 10001 | 10004 | SE | ●● | ●● | ACCELERATION | D | ●● | NODE |
| 10004 | 10003 | 10007 | S | - | - | - | - | - | - | - | - | - |
| ... | ... | ... | ... | ... | ... | ... | ... | ... | ... | ... | ... | ... |

166

INFORMATION MANAGEMENT DEVICE, INFORMATION MANAGEMENT METHOD, AND STORAGE MEDIUM

CROSS-REFERENCE TO RELATED APPLICATION

The Applications is based on Japanese Patent Application No. 2021-054888 filed on Mar. 29, 2021, the content of which is incorporated herein by reference.

BACKGROUND

Field of the Invention

The present invention relates to an information management device, an information management method, and a storage medium.

Description of Related Art

Conventionally, it has been studied and put into practical use to acquire uploaded information from a mobile object such as a vehicle, add information to a map based on the uploaded information, and update the map itself. For example, in the technology described in Japanese Patent Application Laid-open No. 2020-38362, map data for autonomously navigating a vehicle along a road segment is generated, and a vehicle-embedded device acquires at least one image representing the environment of the vehicle from an imaging device, analyzes the image, calculates a position of a landmark relative to a road along which the vehicle has traveled, and uploads probe data including landmark position information to a server.

SUMMARY

Maps in the above fields are usually represented by links (roads) and nodes (intersections, road end points, etc.). Thus, when trying to apply uploaded information to a map, it is sometimes necessary to match specific positions or grasp the general tendency for each region.

The present invention has been made in view of the above-mentioned circumstances, and has an object to provide an information management device, an information management method, and a storage medium, which are capable of managing information for each mesh region delimited by a contour line with a small load.

An information management device, an information management method, and a storage medium according to the present invention adopts the following configuration.

(1): According to one aspect of the present invention, there is provided an information management device, including a storage medium storing a computer-readable instruction and a processor coupled to the storage medium, the processor executing the computer-readable instruction to: acquire, from a mobile object, uploaded information associated with position information on the mobile object; generate mesh information based on the uploaded information; and store the mesh information into a storage in association with a mesh region including the position information on the mobile object among a plurality of mesh regions defined so as to delimit a ground region.

(2): In the aspect (1), the uploaded information is information representing an event between sampling times in the mobile object, and when a first mesh region including position information corresponding to uploaded information of a first sampling time and a second mesh region including position information corresponding to uploaded information of a second sampling time subsequent to the first sampling time are different from each other, the processor distributes details of the uploaded information corresponding to the second sampling time into the first mesh region and the second mesh region proportionally, and generates the mesh information associated with the first mesh region and the mesh information associated with the second mesh region.

(3): In the aspect (1), the uploaded information is generated as information representing an event between sampling times in the mobile object, the plurality of mesh regions are defined so as not to overlap with one another and so that adjacent mesh regions are contact with each other without having a space therebetween, and when a first mesh region including position information corresponding to uploaded information of a first sampling time and a second mesh region including position information corresponding to uploaded information of a second sampling time subsequent to the first sampling time are different from each other, and the first mesh region and the second mesh region are adjacent to each other, the processor distributes details of the uploaded information corresponding to the second sampling time into the first mesh region and the second mesh region proportionally, and generates the mesh information associated with the first mesh region and the mesh information associated with the second mesh region.

(4): In the aspect (3), when the first mesh region including the position information corresponding to the uploaded information of the first sampling time and the second mesh region including the position information corresponding to the uploaded information of the second sampling time are different from each other, and the first mesh region and the second mesh region are not adjacent to each other, the processor identifies a third mesh region different from the first mesh region and the second mesh region, which has been passed by the mobile object between the first sampling time and the second sampling time, based on whether or not a line segment connecting the position information corresponding to the first sampling time and the position information corresponding to the second sampling time intersects with each contour line in the first mesh region and whether or not the line segment intersects with each contour line in the second mesh region, and the processor distributes the details of the uploaded information corresponding to the second sampling time into the first mesh region, the second mesh region, and the third mesh region proportionally, and generates the mesh information associated with the first mesh region, the mesh information associated with the second mesh region, and the mesh information associated with the third mesh region.

(5): In the aspect (1), the processor classifies each of the plurality of mesh regions into at least one of a first type of mesh region, which is adjacent to other two mesh regions, and a second type of mesh region, which is adjacent to other one or three or more mesh regions, based on connection among pieces of position information associated with the uploaded information.

(6): In the aspect (5), the processor classifies each of the plurality of mesh regions into at least one of a first type of mesh region, which is adjacent to other two mesh regions, and a second type of mesh region, which is adjacent to other one or three or more mesh regions, based on connection among pieces of position information associated with the uploaded information.

(7): In the aspect (4), the processor classifies each of the plurality of mesh regions into at least one of a first type of mesh region, which is adjacent to other two mesh regions, and a second type of mesh region, which is adjacent to other one or three or more mesh regions, based on connection among pieces of position information associated with the uploaded information, the processor identifies, preferentially for the first type of mesh region, a third mesh region different from the first mesh region and the second mesh region, which has been passed by the mobile object between the first sampling time and the second sampling time, based on whether or not a line segment connecting the position information corresponding to the first sampling time and the position information corresponding to the second sampling time intersects with each contour line in the first mesh region and whether or not the line segment intersects with each contour line in the second mesh region in a case where the first mesh region including the position information corresponding to the uploaded information at the first sampling time and the second mesh region including the position information corresponding to the uploaded information at the second sampling time are different from each other and the first mesh region and the second mesh region are not adjacent to each other, and the processor distributes the details of the uploaded information corresponding to the second sampling time into the first mesh region, the second mesh region, and the third mesh region proportionally, and generates the mesh information associated with the first mesh region, the mesh information associated with the second mesh region, and the mesh information associated with the third mesh region.

(8): In the aspect (5), the processor sets two or more sections to which the first type of mesh region is adjacent as one path line, and generates, as the mesh information, a transition probability for each transition destination path link, which is a path link to which the mobile object transitions after the one path line.

(9): In the aspect (1), the processor generates the mesh information including a part or all of a movement direction, a movement distance, details of an acceleration/deceleration operation, a shift position, and power consumption of the mobile object.

(10): In the aspect (1), the processor provides information to a user in the mesh region including the position information on the mobile object based on the mesh information corresponding to the mesh region.

(11): In the aspect (10), the processor generates the mesh information including a movement direction of the mobile object, and the processor predicts a path of the mobile object from the movement direction of the mobile object included in the mesh information, and provides information to the user based on the path of the mobile object.

(12): In the aspect (1), the processor generates the mesh information including the number of times of passage of the mobile object, and deletes at least one of the mesh region and the mesh information for which the number of times of passage of the mobile object does not satisfy a criterion.

(13): In the aspect (12), the processor provides information to a user in the mesh region including the position information on the mobile object based on the mesh information corresponding to the mesh region, and the processor provides the user with information that recommends the mesh region for which the number of times of passage of the mobile object satisfies the criterion.

(14): According to another aspect of the present invention, there is provided an information management method to be executed by a computer, the information management method including: acquiring, from a mobile object, uploaded information associated with position information on the mobile object; generating mesh information based on the uploaded information; and storing the mesh information into a storage in association with a mesh region including the position information on the mobile object among a plurality of mesh regions defined so as to delimit a ground region.

(15): According to another aspect of the present invention, there is provided a non-transitory computer-readable storage medium having stored thereon a program for causing a computer to: acquire, from a mobile object, uploaded information associated with position information on the mobile object; generate mesh information based on the uploaded information; and store the mesh information into a storage in association with a mesh region including the position information on the mobile object among a plurality of mesh regions defined so as to delimit a ground region.

According to the aspects (1) to (15), it is possible to manage information for each mesh region delimited by a contour line with a small load.

BRIEF DESCRIPTION OF THE DRAWINGS

FIG. 3 shows an example of the uploaded information stored in an uploaded information table of a storage.

FIG. 4 shows an example of mesh definition information stored in a mesh definition information table of the storage.

FIG. 5 shows an example of mesh information generated by an information generator and stored in a mesh information table of the storage.

FIG. 8 shows an example of the mesh information generated by the information generator in the scene shown in FIG. 7.

DESCRIPTION OF EMBODIMENTS

Figure 1:
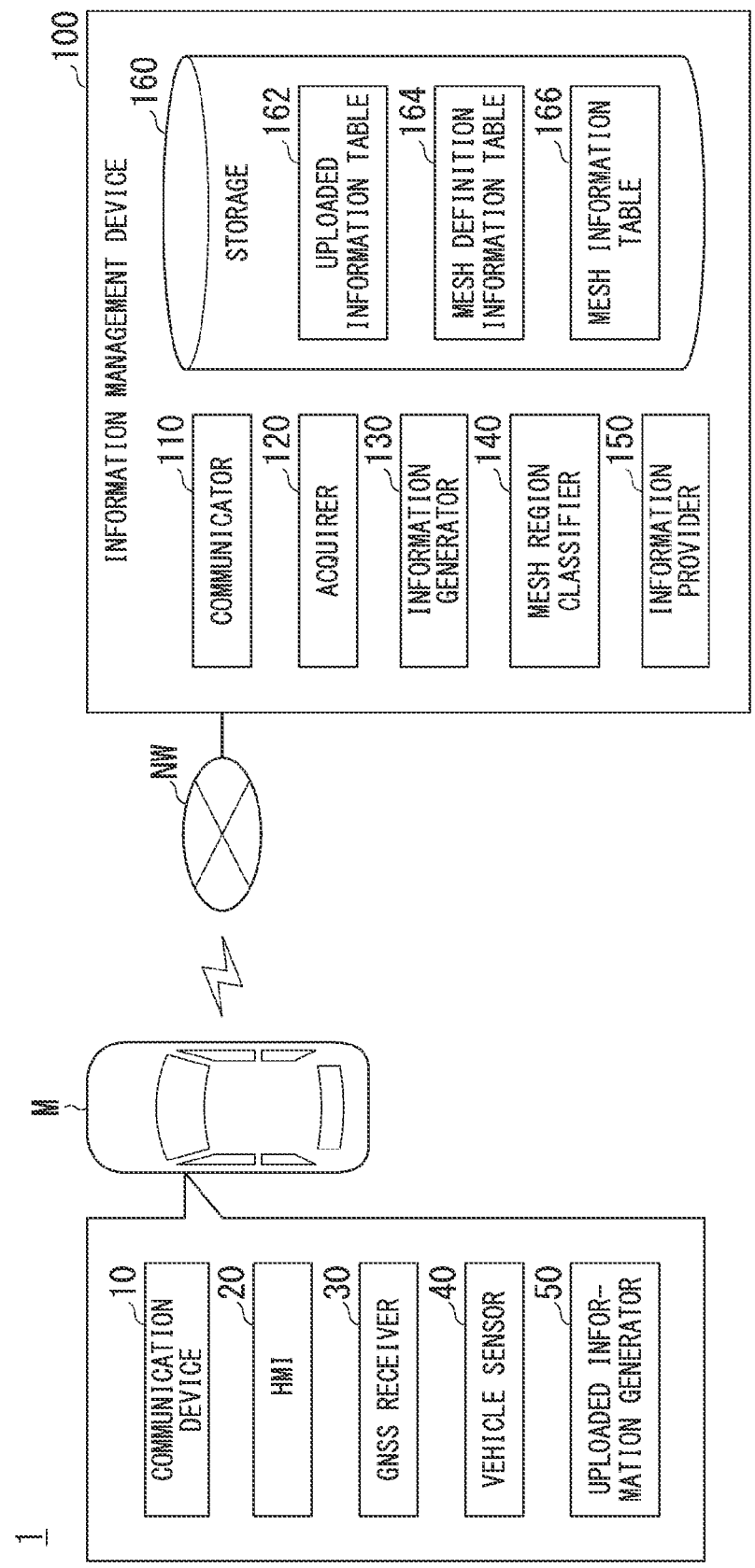
FIG. 1 shows an example of a system that includes an information management device according to the present invention.

Referring to the drawings below, an information management device, an information management method, and a storage medium according to an embodiment of the present invention will be described.

[Overall Configuration]

FIG. 1 shows an example of a system 1 that includes an information management device according to an embodiment of the present invention. As shown in FIG. 1, the system 1 includes a host vehicle M and an information management device 100.

The host vehicle M is, for example, a hybrid vehicle or an electric vehicle. The host vehicle M includes, at least, a communication device 10, an HMI 20, a GNSS receiver 30, a vehicle sensor 40, and an uploaded information generator 50.

The communication device 10 communicates with the information management device 100 using a network NW, such as a cellular network or a Wi-Fi network.

The HMI 20 includes a display device, speaker, touch panel, keys, etc., and provides the occupants of the host vehicle M with information provided by an information provider 150 described below.

The GNSS receiver 30 positions the host vehicle M based on radio waves arriving from GNSS satellites (e.g., GPS satellites) and obtains latitude and longitude information on the host vehicle M.

The vehicle sensor 40 includes a speed sensor that detects the speed of the host vehicle M, an acceleration sensor that detects the acceleration of the host vehicle M, a distance sensor that detects the distance traveled by the host vehicle M, a shift lever position sensor that detects the position of the shift lever (e.g., "D" indicating normal driving), a battery sensor that detects the power consumption of a battery installed in the host vehicle M, etc.

The uploaded information generator 50 generates information such as the speed, acceleration, traveled distance, the shift lever position, and power consumption of the host vehicle M detected by the vehicle sensor 40 in association with position information (latitude and longitude information) acquired by the GNSS receiver 30. The uploaded information generator 50 transmits the generated uploaded information to the information management device 100 at predetermined sampling intervals (e.g., several seconds) using the communication device 10. The uploaded information generator 50 is implemented by a hardware processor (computer) such as a CPU (Central Processing Unit) installed in the host vehicle M executing a program (software).

Figure 2:
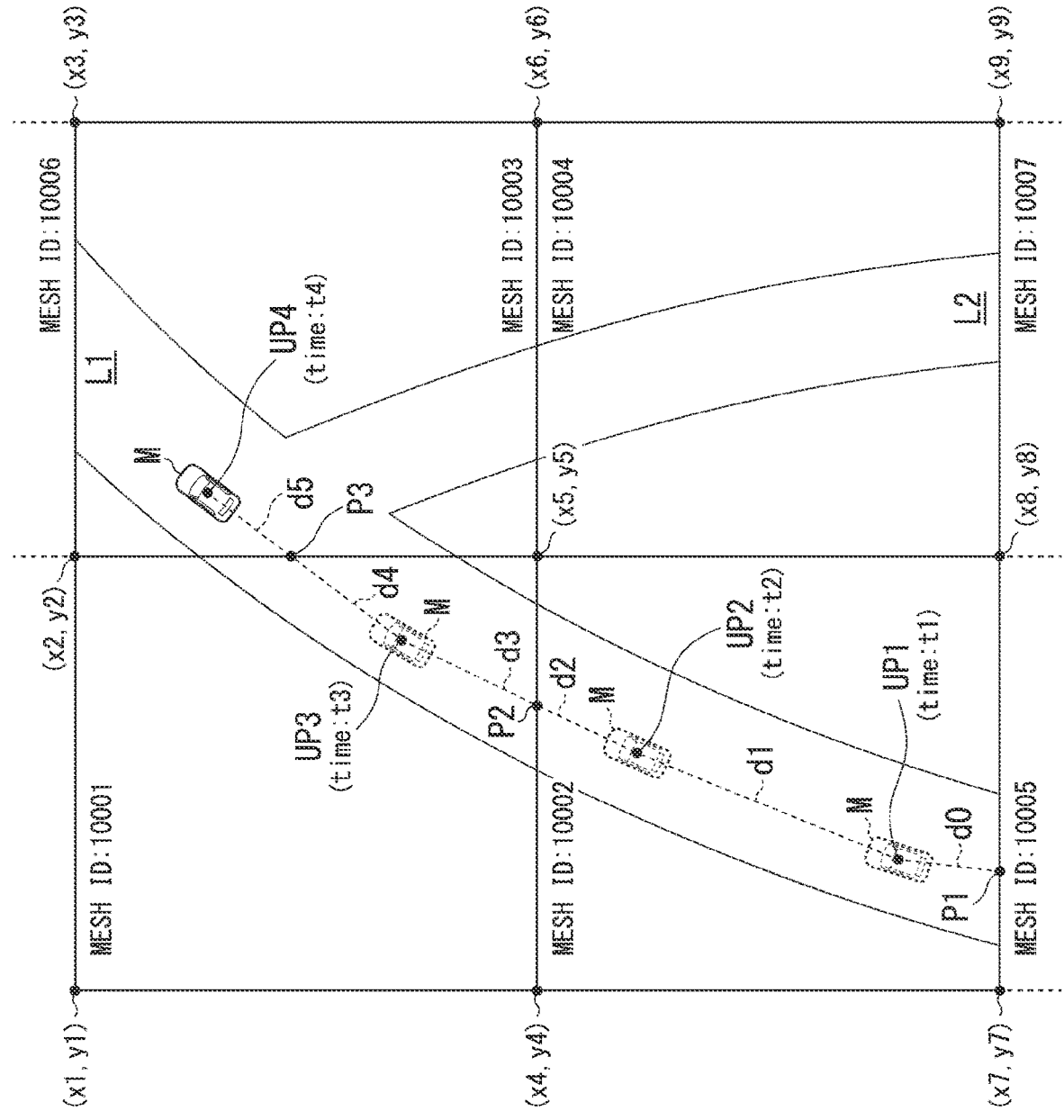
FIG. 2 shows an example of a scene in which an uploaded information generator of a vehicle generates uploaded information and transmits the uploaded information to an information management device using a communication device.

FIG. 2 shows an example of a scene in which the uploaded information generator 50 of the host vehicle M generates uploaded information and transmits the uploaded information to the information management device 100 using the communication device 100. In FIG. 2, the host vehicle M is traveling on the lane L1, and at a time t1, uploaded information is generated and transmitted from an upload point UP1. Next, at a time t2, uploaded information is generated and transmitted from an upload point UP2. Next, at a time t3, uploaded information is generated and transmitted from an upload point UP3. Next, at a time t4, uploaded information is generated and transmitted from an upload point UP4. A mesh id will be described later with reference to FIG. 4.

The information management device 100 includes a communicator 110, an acquirer 120, an information generator 130, a mesh region classifier 140, an information provider 150, and a storage 160. Each of the acquirer 120, the information generator 130, the mesh region classifier 140, and the information provider 150 is implemented by a hardware processor such as a CPU (Central Processing Unit) executing a program (software). Some or all of these components can be implemented by LSI (Large Scale Integration), ASIC (Application Specific Integrated Circuit), FPGA (Field-Programmable Gate Array), GPU (Graphics Processing Unit), and so on, or by the cooperation of software and hardware. The program may be stored in advance in a storage device such as HDD (Hard Disk Drive) or flash memory (a storage device with a non-transitory storage medium), or in a removable storage medium such as DVD or CD-ROM (a non-transitory storage medium), and the program may be installed by attaching the storage medium to a drive device. The storage 160 is implemented by, for example, a ROM (read only memory), a flash memory, an SD card, a RAM (random access memory), or a register.

The communicator 110 is an interface that communicates with the communication device 10 of the host vehicle M via the network NW. For example, the communicator 110 is equipped with a NIC (Network Interface Card) and an antenna for wireless communication.

The acquirer 120 acquires the uploaded information associated with the position information of the host vehicle M from the host vehicle M, and stores the uploaded information into an uploaded information table 162 of the storage 160. FIG. 3 shows an example of the uploaded information stored in the uploaded information table 162 of the storage 160. In FIG. 3, the time indicates the time at which the host vehicle M transmitted the uploaded information. The longitude indicates the longitude of the host vehicle M at the time of transmission. The latitude indicates the latitude of the host vehicle M at the time of transmission. The travelled distance indicates the distance travelled by the host vehicle M between the last transmission time and the current transmission time. The speed indicates the speed of the host vehicle M at the time of transmission. The acceleration/deceleration indicates whether the host vehicle M accelerated or decelerated at the time of transmission. SP indicates the shift position at the time of transmission. The power consumption indicates the power consumed by the battery of the host vehicle M between the previous transmission time and the current transmission time. The acceleration/deceleration is not limited to information indicating whether the host vehicle M accelerated or decelerated, but may also be information indicating the value of acceleration/deceleration of the host vehicle M itself. In FIG. 3, D1 to D4 indicate the distance traveled from the time t1 to the time t4, V1 to V4 indicate the speed from the time t1 to the time t4, and X1 to X4 indicate the power consumption from the time t1 to the time t4. In addition, in FIG. 3, SP is set to "D" for normal driving, "P" for parking, "R" for reversing, and "D" for downshifting.

The information generator 130 generates mesh information to be described below based on the uploaded information acquired by the acquirer 120, and stores the mesh information into a mesh information table 166 of the storage unit 160 in association with a mesh region including the position information of the host vehicle M among a plurality of mesh regions defined to delimit the ground region. More specifically, the information generator 130 first refers to the mesh definition information table 164 included in the storage 160 to identify a mesh region including the position information of the host vehicle M. In general, the mesh id of a mesh region can be calculated by using a specific formula based on the latitude and longitude, and the information generator 130 can identify the mesh region based on the uploaded information acquired by the acquirer 120.

FIG. 4 shows an example of mesh definition information stored in the mesh definition information table 164 of the storage 160. In FIG. 4, the mesh id is an identifier that uniquely identifies the mesh region. The Ne coordinate is a coordinate point in the northeast direction of the mesh region, the Se coordinate is a coordinate point in the southeast direction of the mesh region, the Nw coordinate indicates a coordinate point in the northwest direction of the mesh region, and the Sw coordinate indicates a coordinate point in the southwest direction of the mesh region. For example, the mesh region with the mesh id 10001 has (x1, y1) as Ne coordinates, (x2, y2) as Se coordinates, (x3, y3) as Nw coordinates, and (x4, y4) as Sw coordinates. These coordinates correspond to the fourth coordinates of the mesh region indicated by the mesh id 10001 in FIG. 2. In this case, the x coordinate indicates longitude and the y coordinate indicates latitude.

When the information generator 130 identifies a mesh region that includes the position information included in the uploaded information, the information generator generates mesh information based on the uploaded information and the identified mesh region, and stores the generated mesh information into the mesh information table 166 of the storage 160 in correspondence with the mesh region.

FIG. 5 shows an example of the mesh information generated by the information generator 130 and stored in the mesh information table166 of the storage 160. In FIG. 5, the input mesh id (i.e., input mesh id_1 and input mesh id_2) is an identifier that identifies the mesh region that the host vehicle M passed through just before entering the mesh region with the mesh id. The output mesh id (i.e., output mesh id_1 and output mesh id_2) is an identifier that identifies the mesh region that the host vehicle that the host vehicle M entered next after passing through the mesh region with the mesh id.

The movement direction (i.e., movement direction_1 and movement direction_2) indicates the movement direction of the mesh region of mesh id. The distance traveled is the distance traveled by the host vehicle M in the mesh region with the mesh id (e.g., the average distance if the host vehicle M traveled through the same mesh region multiple times). The speed is the speed at which the host vehicle M traveled through the mesh region with the mesh id (e.g., the average speed if the vehicle travelled through the same mesh region multiple times). The acceleration/deceleration indicates whether the host vehicle M accelerated or decelerated in the mesh region with the mesh id (e.g., if the host vehicle M traveled in the same mesh region multiple times, for example, the more frequent one of acceleration and deceleration). SP indicates the shift position in the mesh region with the mesh id (e.g., if the host vehicle M traveled in the same mesh region multiple times, for example, the shift position with the highest number of times is shown). The power consumption indicates the amount of power consumed by the battery when the host vehicle M travelled through the mesh region with the mesh id (e.g., the average power consumption if the host vehicle M travelled through the same mesh region multiple times). The type indicates whether the mesh region with the mesh id is a link or a node as described below. In addition to this, the mesh information can be used to indicate whether the mesh is the start or end point of the movement of the mobile object (or neither). In addition, for a mesh that is classified as a link (see below), the mesh information may include probability information for each node (mesh) indicating to which node (mesh) the mobile object moving through the mesh is moving. In the above, the input mesh id and the output mesh id are set to two. However, this is only one example, and any number of input and output mesh ids may be set. For example, there is sometimes a road with different speed and power consumption requirements depending on the movement direction, such as a slope, and thus it is possible to perform analysis for each movement direction by setting the input mesh id and output mesh id to the same number. The following is a description of the specific method by which the information generator 130 generates this information.

[Generation of Input Mesh Id and Output Mesh Id].

When the information generator 130 identifies the mesh region that includes the position information included in the uploaded information. The information generator generates an input mesh id based on the uploaded information received immediately before the uploaded information. For example, in the scene shown in FIG. 2, the information generator 130 receives uploaded information at the time t3, and identifies that the position information included in the uploaded information is included in the mesh region with the mesh id 10001. At this time, the information generator 130 simultaneously refers to the uploaded information table, extracts the uploaded information received at the time t2 immediately before the time t3, and identifies that the position information included in the uploaded information is included in the mesh region with the mesh id 10002. Thus, the information generator 130 sets the mesh id 10002 as the input mesh id of the mesh id 10001. At the same time, the information generator 130 sets the mesh id 10002 as the output mesh id of the mesh id 10002. In other words, the information generator 130 generates the output mesh id based on the uploaded information received immediately after.

[Generate of Movement Direction]

Figure 6:
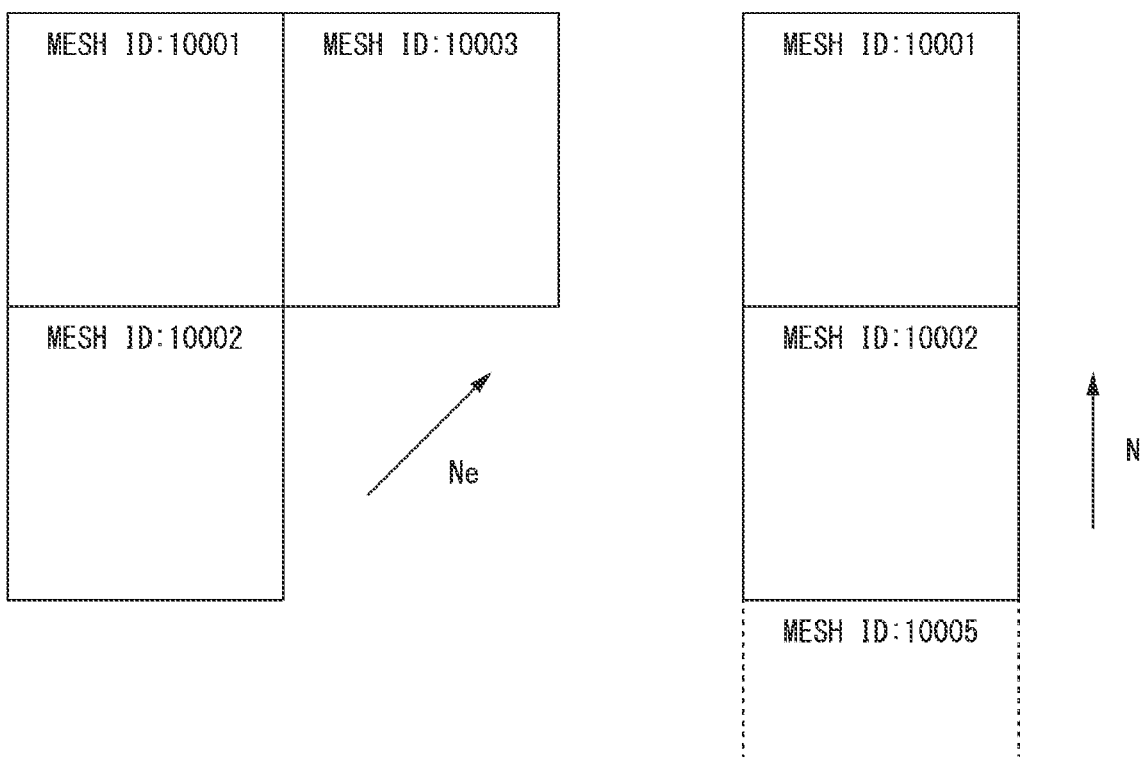
FIG. 6 shows an example of the movement direction of the vehicle generated by the information generator.

The information generator 130 uses the mesh id, the input mesh id, and the output mesh id to generate the movement direction in which the host vehicle M has moved through the mesh region with the mesh id. FIG. 6 shows an example of the movement direction of the host vehicle M generated by the information generator 130. The left part of FIG. 6 shows the combination of the mesh id 10001, the input mesh id 10002, and the output mesh id 10003, and the right part of FIG. 6 shows the combination of the mesh id 10002, the input mesh id 10005, and the output mesh id 10001. In the case of the left part of FIG. 6, the direction from the mesh region of the input mesh id 10002 serving as the starting point to the mesh region of the output mesh id 10003 serving as the end point is northeast (Ne). Thus, the information generator 130 sets Ne as the movement direction of the host vehicle M in the mesh region of mesh id 10001. Further, in the case of the right part of FIG. 6, the direction from the mesh region of the input mesh id 10005 serving as the starting point to the mesh region of the output mesh id 10001 serving as the end point is north (N). Thus, the information generator 130 sets N as the movement direction of the host vehicle M in the mesh region with the mesh id 10002. In this way, the information generator 130 can set all 8 possible movement directions depending on the combination of the mesh id, the input mesh id, and the output mesh id. In addition, the information generator 130 my set all 12 possible movement directions depending on the combination of the mesh id, input mesh id, and the output mesh id by additionally considering the positional relationship between the mesh id, the input mesh id, and the output mesh id. In other words, in the left part of FIG. 6, the mesh region with the mesh id 10001 is north of the mesh region with the input mesh id 10002, and the mesh region of the output mesh id 10003 serving as the endpoint is east of the mesh region with the mesh id 10001. Thus, the information generator 130 may determine that the host vehicle M has moved from the mesh region with the input mesh id 10002 serving as the start point to the mesh region with the output mesh id 10003 serving as the end point via the north direction, and set NNe as the movement direction of the host vehicle M in the mesh region with the mesh id 10001. When the mesh region with the mesh id 1000X is east of the mesh region with the input mesh id 1000Y, and the mesh region with the output mesh id 1000Z is north of the mesh region with the mesh id 1000X, the information generator 130 may determine that the host vehicle M has moved from the mesh region with the mesh id 1000Y serving as the start point to the mesh region with the output mesh id 1000Z serving as the end point via the east direction, and set Nee as the movement direction of the host vehicle M in the mesh region with the mesh id 1000X.

[Generation of Travelled Distance]

The information generator 130 uses the plurality of uploaded information transmitted at different consecutive times to generate the distance traveled by the host vehicle M in the corresponding mesh region. For example, in the scene shown in FIG. 2, the information generator 130 receives uploaded information from the upload point UP1 at the time t1, and receives uploaded information from the upload point UP2 at the time t2. The upload point UP1 and the upload point UP2 are both included in the mesh region of the mesh id 10002. Thus, the information generator 130 can identify the travelled distance D2 (that is, equal to d1 of FIG. 2) included in the uploaded information transmitted from the upload point UP2 as a part of the distance traveled by the host vehicle M in the mesh region.

However, on the other hand, when the first mesh region including the upload point corresponding to the uploaded information at the first time and the second mesh region including the upload point corresponding to the uploaded information at a second time, which is next to the first time, are different from each other, the travelled distance included in the uploaded information at the second time is a distance that extends over both the first mesh region and the second mesh region. For this reason, the travelled distance cannot be identified as the distance traveled by the host vehicle M in either mesh region. In such a case, the information generator 130 distributes the travelled distance included in the uploaded information at the second time into the first mesh region and the second mesh region proportionally, and generates the travelled distance corresponding to the first mesh region and the travelled distance corresponding to the second mesh region.

For example, in the scene shown in FIG. 2, the host vehicle M transmits uploaded information from the upload point UP2, which is included in the mesh region with the mesh id 10002, at the time t2, and at the next time t3, transmits uploaded information from the upload point UP3, which is included in the mesh region with the mesh id 10001. At this time, the information generator 130 connects the upload point UP2 and the upload point UP3 by a line segment, and determines an intersection point P2 between the line segment and a boundary line between the mesh region with the mesh id 10002 and the mesh region with the mesh id 10001. Next, the information generator 130 uses the distance d2 from the upload point UP2 to the intersection point P2, and the distance d3 from the intersection point P2 to the upload point UP3 to generate $\{d2/(d2+d3)\} \times D3$ [km] as part of the travelled distance corresponding to the mesh region with the mesh id 10002, and $\{d3/(d2+d3)\} \times D3$ [km] as a part of the travelled distance corresponding to the mesh region with the mesh id 10001. In the same way, the mesh region including the upload point UP4 where uploaded information is transmitted is different from the mesh region at the time t3, and thus at the time t4, as shown in FIG. 2, the information generator 130 generates $\{d4/(d4+d5)\} \times D4$ [km] as part of the travelled distance corresponding to the mesh region with the mesh id 10001. Then, the information generator 130 takes the sum of the values of the calculated travelled distance and generates $\{d3/(d2+d3)\} \times D3 + \{d4/(d4+d5)\} \times D4$ [km] as the travelled distance corresponding to the mesh region with the mesh id 10001. D3 is the distance traveled by the host vehicle M between the time t2 and the time t3, and D4 is the distance traveled by the host vehicle M between the time t3 and the time t4.

[Generation of Power Consumption]

The information generator 130 generates the power consumption of the host vehicle M in the corresponding mesh region based on the plurality of uploaded information transmitted at different consecutive times. For example, in the scene shown in FIG. 2, the upload point UP1 and the upload point UP2 are both included in the mesh region with the mesh id 10002. Thus, the information generator 130 can identify the power consumption X2 included in the uploaded information transmitted from the upload point UP2 as part of the power consumption X2 of the host vehicle M in the mesh region.

However, on the other hand, when the first mesh region including the upload point corresponding to the uploaded information at the first time and the second mesh region including the upload point corresponding to the uploaded information at a second time, which is next to the first time, are different from each other, the power consumption included in the uploaded information at the second time is power consumption that extends over both the first mesh region and the second mesh region. For this reason, the power consumption cannot be identified as the power consumption of the host vehicle M in either mesh region. In such a case, the information generator 130 distributes the power consumption included in the uploaded information at the second time into the first mesh region and the second mesh region proportionally, and generates the power consumption corresponding to the first mesh region and the power consumption corresponding to the second mesh region. Specifically, similarly to the case of generating the travelled distance, for example, the power consumption corresponding to the mesh region with the mesh id 10001 in the scene shown in FIG. 2 is calculated by $\{d3/(d2+d3)\} \times X3 + \{d4/(d4+d5)\} \times X4$ [Wh]. X3 is the power consumed by the battery of the host vehicle M between the time t2 and the time t3, and X4 is the power consumed by the battery of the host vehicle M between the time t3 and the time t4.

[Generation of Speed, Acceleration/Deceleration, Shift Position]

The information generator 130 generates the speed information included in the uploaded information as the speed information to be stored in the mesh information table 166. When more than one uploaded information corresponding to the same mesh region are transmitted, the information generator 130 generates the average value of the speeds included in the plural uploaded information as the speed information. In the scene shown in FIGS. 2, V1 and V2 are transmitted as the speed information in the mesh region with the mesh id 10002. Thus, the information generator 130 generates (V1+V2)/2[km/h] as the speed information to be stored in a record identified by the mesh id 10002 in the mesh information table 166. In addition to or instead of the above, the information generator 130 may calculate the speed of the vehicle based on the uploaded time information and the traveled distance information, and generate the speed as the speed information to be stored in the mesh information table 166. In addition, when there are multiple uploaded information in the same mesh region, the information generator 130 may add the speeds calculated for respective sections by using the distance occupying the mesh as a specific ratio. For example, in the scene shown in FIG. 2, when determining the speed in the mesh region with the mesh id 10001, $v3 = \{(d3+d2)/(t3-t2)\} \times \{d3/(d3+d2)\}$, which is the speed of a section between the point P2 and the point P3, and v4={(d4+d5)/(t4−−t3)}×{d4/(d4+d5)}, which is the speed of a section between the point UP3 and the point P3, are calculated, and V={v3×d3/(d3+d4)}+{v4×d4/(d3+d4)} is calculated as the speed of the mesh id 10001 to be stored into the mesh information table 166. In this way, even if the host vehicle M accelerates or decelerates instantaneously and the speed at the moment of upload is not the representative value of the section, the stable speed can be calculated. The information generator 130 can also generate the acceleration/deceleration information included in the uploaded information as acceleration/deceleration information to be stored into the mesh information table 166. If multiple acceleration/deceleration information corresponding to the same mesh region and having conflicting contents is transmitted, the information generator 130 may, for example, count the number of times of transmission of acceleration or deceleration, and generate the one with the higher number of times as acceleration/deceleration information. The same applies to the shift position. In addition to or instead of the above, the information generator 130 may generate the shift position included in the uploaded information as shift position information to be stored into the mesh information table 166, or if there are different shift positions in the same mesh region, all the different shift positions may be generated as shift position information to be stored into the mesh information table 166.

[Generation of Type]

The mesh region classifier 140 classifies each of the mesh regions into at least a link adjacent to two other mesh regions and a node adjacent to one or three or more mesh regions based on the connection of position information associated with the uploaded information. In other words, the mesh region classifier 140 uses the mesh information table 166 to classify, as a link, a mesh region with a mesh id, which is not the movement start point or the movement end point and has only one combination of the input mesh id and the output mesh id, and classifies, as a node, a mesh region with a mesh id, which has two or more combinations of the input mesh id and the output mesh id, and a mesh region serving as the movement start point or the movement end point. The information generator 130 generates the result of classification by the mesh region classifier 140 as the type, and stores the type into the mesh information table 166. The link is an example of "first type of mesh region", and the node is an example of "second type of mesh region".

Figure 7:
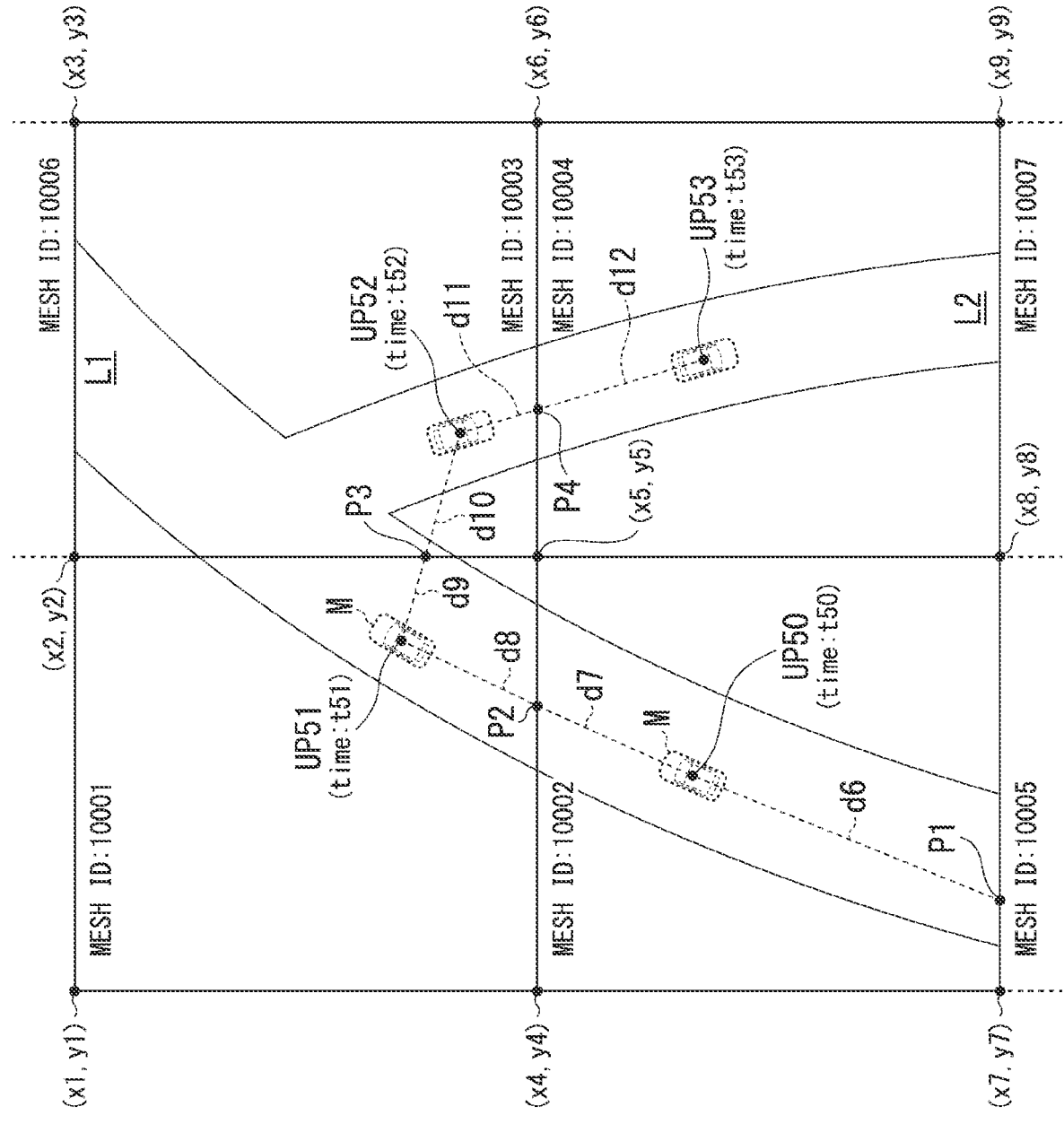
FIG. 7 shows an example of a scene in which a mesh region classifier classifies a mesh region as a node.

FIG. 7 shows an example of a scene in which the mesh region classifier140 classifies a mesh region as a node. FIG. 7 shows that a predetermined period of time has passed since the scene shown in FIG. 2, and the host vehicle M is traveling on a lane L1 again. Contrary to the scene of FIG. 2, the host vehicle M turns right on the lane L1, and enters a lane L2. At a time t52, the host vehicle M transmits uploaded information from the upload point UP52 included in the mesh region of the mesh id 10003, and then at a time t53, transmits uploaded information from the upload point UP53 included in the mesh region of the mesh id 10004. After that, the host vehicle M enters the mesh region of the mesh id 10007.

FIG. 8 shows an example of the mesh information generated by the information generator 130 in the scene shown in FIG. 7. Referring to FIG. 8, in addition to the combination of the mesh id 10003, the input mesh id 10001, and the output mesh id 10006, a combination of the mesh id 10003, the input mesh id 10001, and the output mesh id 10004 is newly registered. Thus, the mesh region classifier 140 classifies the mesh region of the mesh id 10003 as a node, and the information generator 130 stores the information into the mesh information table 166.

In the examples of FIG. 7 and FIG. 8, the host vehicle M goes straight in the lane L1 from the time t3 to the time t4, and then turns right in the lane L1 from the time t51 to the time t52. Thus, the mesh region classifier 140 classifies the mesh region of the mesh id 10003 as a node. However, if, hypothetically, the vehicle M continues to go straight in the lane L1 from the time t51 to the time t52, then the mesh area classifier 140 continues to classify the mesh region of the mesh id 10006 as a link. In other words, the classification of the mesh region is not uniquely determined by lane or road structure, etc., but may be obtained as a result of classification for each user based on the location information corresponding to the uploaded information for each user of the host vehicle M. The unit area of the mesh region may also be set for each user according to the type of the vehicle M (e.g., type of mobile vehicle such as a motorcycle, walking robot, etc.) in addition to classification of the mesh region.

In addition, in the mesh information table 166 shown in FIG. 8, for convenience of explanation, only one set of information on distance traveled, speed, acceleration/deceleration, SP, and power consumption is set for the combination of the mesh id, the input mesh id_1 and the output mesh id_1, and the combination of the mesh id, the input mesh id_2, and the output mesh id_2. However, the present invention is not limited to this configuration, and information on distance traveled, speed, acceleration/deceleration, SP, and power consumption may be set for each of the combination of the mesh id, the input mesh id_1 and the output mesh id_1, and the combination of the mesh id, the input mesh id_2, and the output mesh id_2. In this way, the information can be managed independently for multiple routes on the same road that differ only in direction of travel, and the accuracy of the information can be improved.

Figure 9:
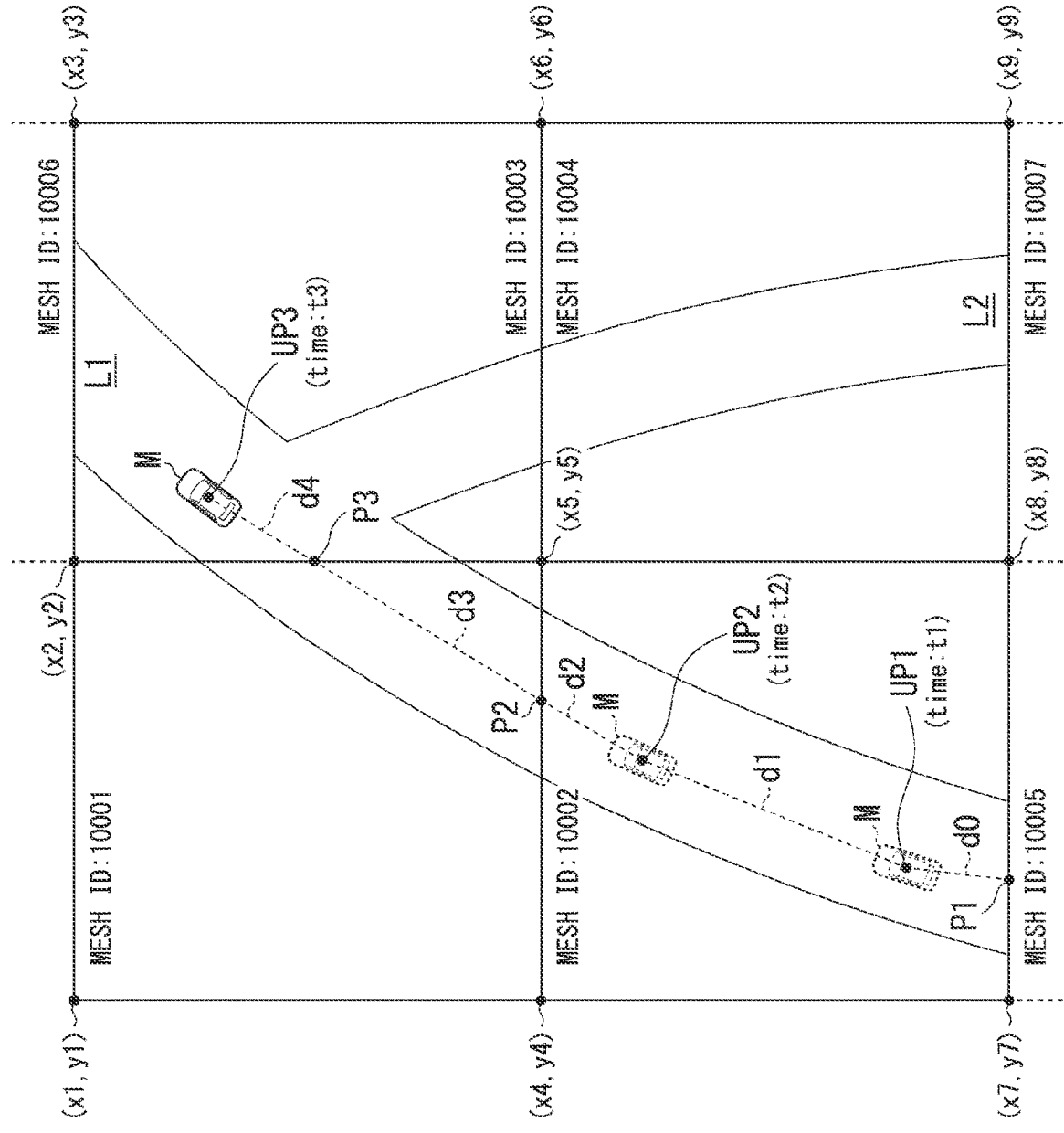
FIG. 9 shows an example of another scene in which the information generator distributes the mesh information proportionally.

Next, referring to FIG. 9, description is given of another example in which the information generator 130 distributes the mesh information proportionally. FIG. 9 shows an example of another scene in which the information generator distributes the mesh information proportionally. In FIG. 9, the own vehicle M is traveling in the lane L1, and at the time t2, uploaded information is transmitted from the upload point UP2, which is included in the mesh region of the mesh id 10002, and then at the time t3, uploaded information is transmitted from the upload point UP3, which is included in the mesh region of the mesh id 10003. In other words, contrary to the case of FIG. 2, the mesh region at the time t2 and the mesh region at the time t3 are not adjacent to each other.

When the first mesh region that includes the position information corresponding to the uploaded information at the first time and the second mesh region that includes the position information corresponding to the uploaded information at the second time, which is the next time after the first time, are different and the first mesh region and the second mesh region are not adjacent to each other, the information generator 130 identifies a third mesh region different from the first mesh region and the second mesh region, which the host vehicle M has passed between the two times, on the basis of whether or not the line segment connecting these two pieces of position information and each contour line in the first mesh region intersect with each other, and on the basis of whether or not the line segment and each contour line in the second mesh region intersect with each other. In the case of FIG. 9, the information generator 130 identifies that the line segment connecting the upload point UP2 and the upload point UP3 and the contour line of the mesh region of the mesh id 10002 intersect at the point P2, and that the line segment and the contour line of the mesh region of the mesh id 10003 intersect at the point P3. Next, the information generator 130 identifies the mesh region of the mesh id 10001, which has both of the point P2 and the point P3 on its contour line, and identifies the mesh region as a third mesh region that the host vehicle M has passed through between the time t2 and the time t3. Such an identification method is hereinafter sometimes referred to as "line segment intersection determination".

When the third mesh region is identified, the information generator 130 distributes the details of the uploaded information corresponding to the second time proportionally among the first mesh region, the second mesh region, and the third mesh region, and generates mesh information associated with the first region, mesh information associated with the second region, and mesh information associated with the third region. For example, in the case of FIG. 9, when it is assumed that the host vehicle M has transmitted uploaded information including the traveled distance D3 [km] and the power consumption X3 [Wh] at the upload point UP3, the information generator 130 distributes the traveled distance D3 proportionally among the mesh region of the mesh id 10002, the mesh region of the mesh id 10001, and the mesh region of the mesh id 10006. Specifically, the information generator 130 calculates the traveled distance associated with the mesh region of the mesh id id10002 as d2/(d2+d3+d4)×D3 [km], calculates the traveled distance associated with the mesh region of the mesh id id10001 as d3/(d2+d3+d4)×D3 [km], and calculates the traveled distance associated with the mesh region of the mesh id id10006 as d4/(d2+d3+d4)×D3 [km]. Similarly, the information generator 130 calculates the power consumption associated with the mesh region of the mesh id id10002 as d2/(d2+d3+d4)×X3 [Wh], calculates the power consumption associated with the mesh region of the mesh id id10001 as d3/(d2+d3+d4)×X3 [Wh], and calculates the power consumption associated with the mesh region of the mesh id id10006 as d4/(d2+d3+d4)×X3 [Wh]. In this manner, even when the host vehicle M moves at high speed, and has passed through a certain mesh region without transmitting uploaded information, it is possible to flexibly calculate the mesh information to be assigned to the mesh region.

Meanwhile, the distance of the earth's longitude varies depending on the location on the earth; therefore, it is more preferable for the information generator 130 to perform a plane coordinate transformation and change the scale when identifying the intersection between the contour line of each mesh region and the line segment connecting one upload point between a next upload point.

Figure 10:
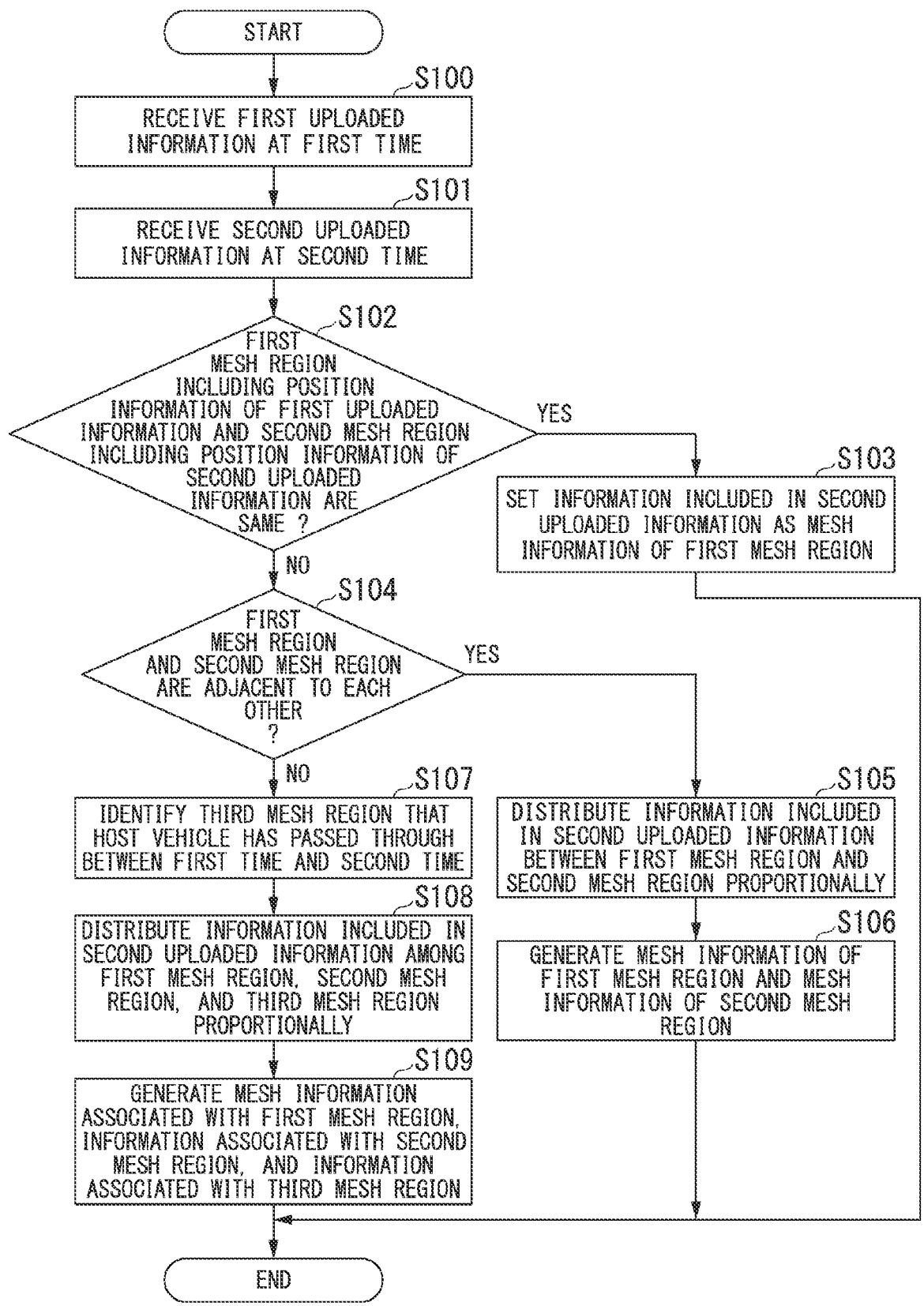
FIG. 10 is a flow chart showing an example of a flow of processing to be executed by the information generator.

Next, referring to FIG. 10, description is given of a flow of processing to be executed by the information generator 130. FIG. 10 is a flow chart illustrating an example of the flow of processing to be executed by the information generator 130.

First, the information generator 130 receives first uploaded information from the host vehicle M at the first time (Step S100). Next, the information generator 130 receives second uploaded information from the host vehicle M at the second time (Step S101). Next, the information generator 130 determines whether or not the first mesh region including position information corresponding to the first uploaded information and the second mesh region including position information corresponding to the second uploaded information are the same as each other (Step S102). When it is determined that the first mesh region and the second mesh region are the same as each other, the information generator 130 sets the information included in the second uploaded information as the mesh information of the second mesh region. For example, the information generator 130 sets the traveled distance included in the second uploaded information as the traveled distance in the first mesh region (Step S103).

On the other hand, when it is determined that the first mesh region and the second mesh region are not the same as each other, the information generator 130 determines whether or not the first mesh region and the second mesh region are adjacent to each other (Step S104). When it is determined that the first mesh region and the second mesh region are adjacent to each other, the information generator 130 distributes the details of information included in the second uploaded information proportionally between the first mesh region and the second mesh region (Step S105). Next, the information generator 130 generates mesh information associated with the first mesh region and mesh information associated with the second mesh region (Step S106). The information generator 130 may determine whether or not the first mesh region and the second mesh region are adjacent to each other by determining whether or not the number of corners at which the first mesh region and the second mesh region match each other is smaller than two. In other words, when the number of corners at which the first mesh region and the second mesh region match each other is two, it is determined that the first mesh region and the second mesh region are adjacent to each other, whereas when the number of corners at which the first mesh region and the second mesh region match each other is zero or one, it is determined that the first mesh region and the second mesh region are not adjacent to each other.

When it is determined that the first mesh region and the second mesh region are not adjacent to each other, the information generator 130 uses the above-mentioned line segment intersection determination to identify a third mesh region different from the first mesh region and the second mesh region, which has been passed through by the host vehicle M between the first time and the second time (Step S107). Next, the information generator 130 distributes the details of information included in the second uploaded information proportionally among the first mesh region, the second mesh region, and the third mesh region (Step S108). Next, the information generator 130 generates mesh information associated with the first mesh region, mesh information associated with the second mesh region, and mesh information associated with the third mesh region (Step S109). In this manner, the processing of this flowchart is finished.

In the processing of the flow chart described above, line segment intersection determination is used to identify the third mesh region in Step S107 to Step S109. However, the present invention is not limited to this configuration, and the information generator 130 may execute determination using line segment intersection determination preferentially for a mesh region classified as a link. For example, when the mesh region including position information corresponding to the second uploaded information received in Step S101 is classified as a link, the information generator 130 may execute determination using line segment intersection determination preferentially for the mesh region. This is because the host vehicle M is moving at high speed in the mesh region classified as a link, and it is assumed that the host vehicle M is likely to move through mesh regions, which are not adjacent to each other, between sampling times.

The information provider 150 provides information to an occupant in a mesh region including the position information of the host vehicle M on the basis of the mesh information associated with the mesh region. For example, the information provider 150 estimates a road type (for example, main road or urban area) of the mesh region on the basis of the speed included in the mesh information, transmits the estimated information to the host vehicle M, and causes the HMI 20 of the host vehicle M to display the estimated information.

Figure 11:
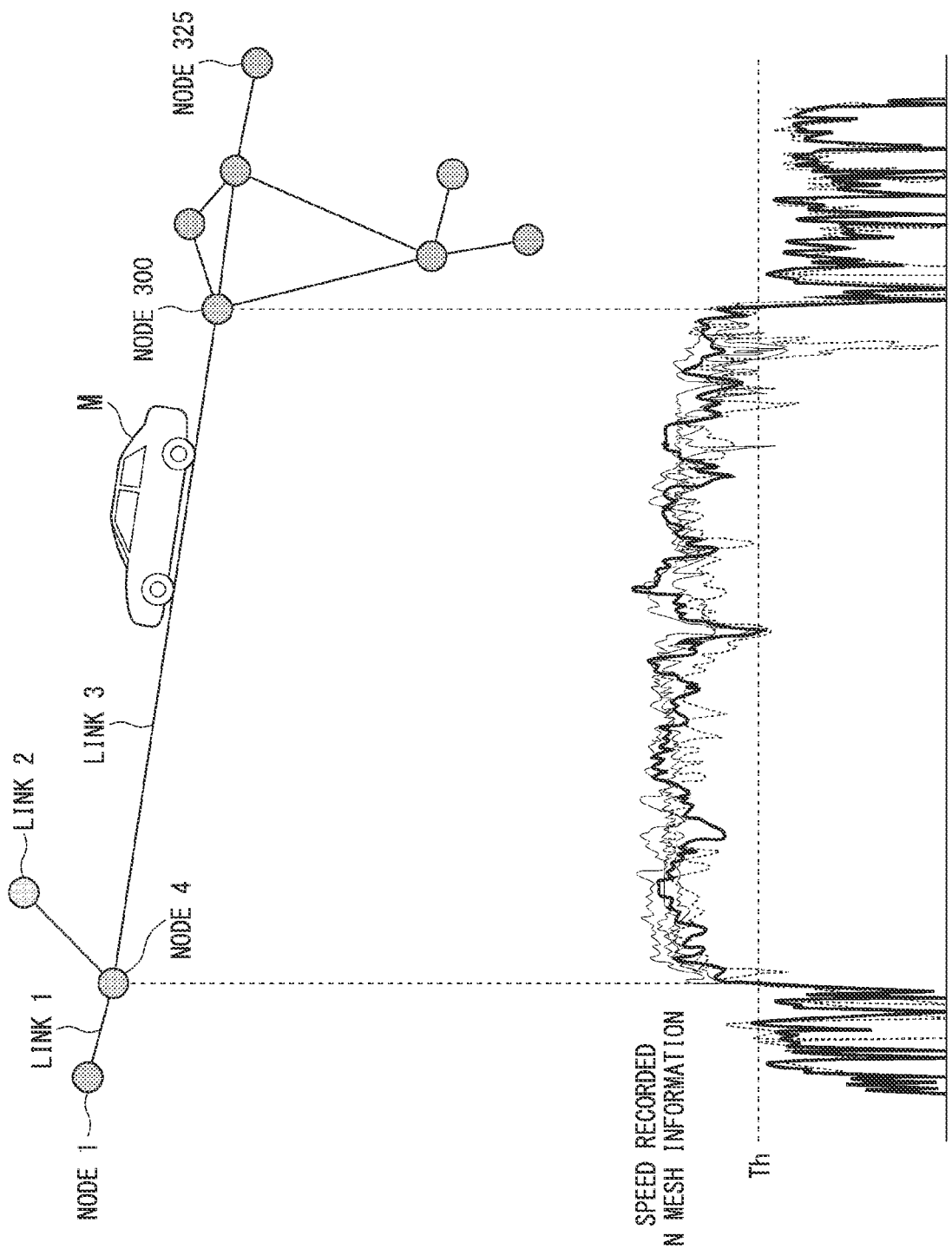
FIG. 11 shows an example of a road type estimated by the information provider.

FIG. 11 shows an example of a road type estimated by the information provider 150. As shown in FIG. 11, the host vehicle M is traveling on a road corresponding to the mesh region indicated by a link 3, and transmits uploaded information including speed information to the information management device 100. The information generator 130 of the information management device 100 generates mesh information including the speed (average speed) calculated in consideration of the speed information. At this time, the information provider 150 detects that the speed of the link 3 between the mesh 300 and the mesh 4 is equal to or larger than a threshold value Th, and estimates that the road corresponding to the link 3 is a main road. After that, the information provider 150 transmits, to the host vehicle M, information indicating that the road on which the host vehicle M is currently traveling is a main road, and causes the HMI 20 to display the information. Instead of or in addition to executing the line segment intersection determination preferentially for a mesh region classified as a link, the information generator 130 may execute the line segment intersection determination for a mesh region detected to have an average speed equal to or larger than the threshold value Th (i.e., main road). This is because, similarly to the case of a link, the host vehicle M is moving at high speed in the mesh region detected as a main road, and it is assumed that the host vehicle M is likely to move through mesh regions, which are not adjacent to each other, between sampling times.

Figure 12:
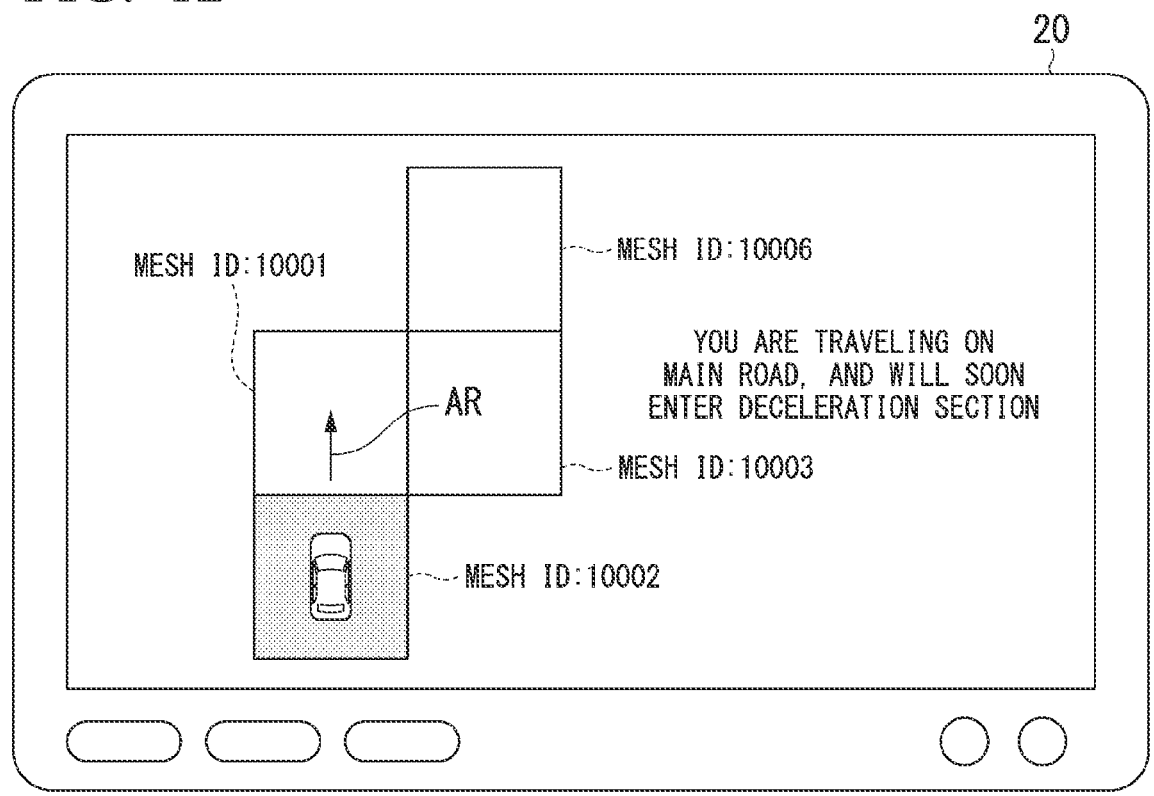
FIG. 12 shows an example of information provided by the information provider and displayed on an HMI.

FIG. 12 shows an example of information provided by the information provider 150 and displayed on the HMI 120. In the scene of FIG. 12, it is assumed that the host vehicle M is traveling on a road corresponding to the mesh region of the mesh id 10002. Furthermore, it is assumed that information displayed on the HMI 20 in FIG. 12 is provided by the information provider 150 based on the mesh information table 166 of FIG. 5.

The information provider 150 predicts the path of the host vehicle M based on the direction of movement of the host vehicle M included in the mesh information, and provides information to an occupant based on the path of the host vehicle M. For example, referring to the record of the mesh id 10002 in the mesh information table 166 in FIG. 5, the input mesh id_1 of the mesh id 10002 is 10005, the output mesh id_1 is 10001, and the movement direction_1 is N (north). Thus, the information provider 150 predicts the path for the host vehicle M to move from the mesh region of the mesh id 10002 to the mesh region of the mesh id 10001, and displays the predicted path on the HMI 20 using, for example, an arrow AR. Further, for example, referring to the record of the mesh id id10001 in the mesh information table 166, acceleration/deceleration indicates deceleration. Thus, the information provider 150 causes the HMI 20 to display information indicating that the host vehicle M soon enters a deceleration section. Although this embodiment describes the case where the host vehicle M is driven manually by an occupant, in the case of automatic driving, the information provided by the information provider 150 can be used to control automatic driving, for example, by decelerating the host vehicle M based on acceleration/deceleration information indicating deceleration.

Figure 13:
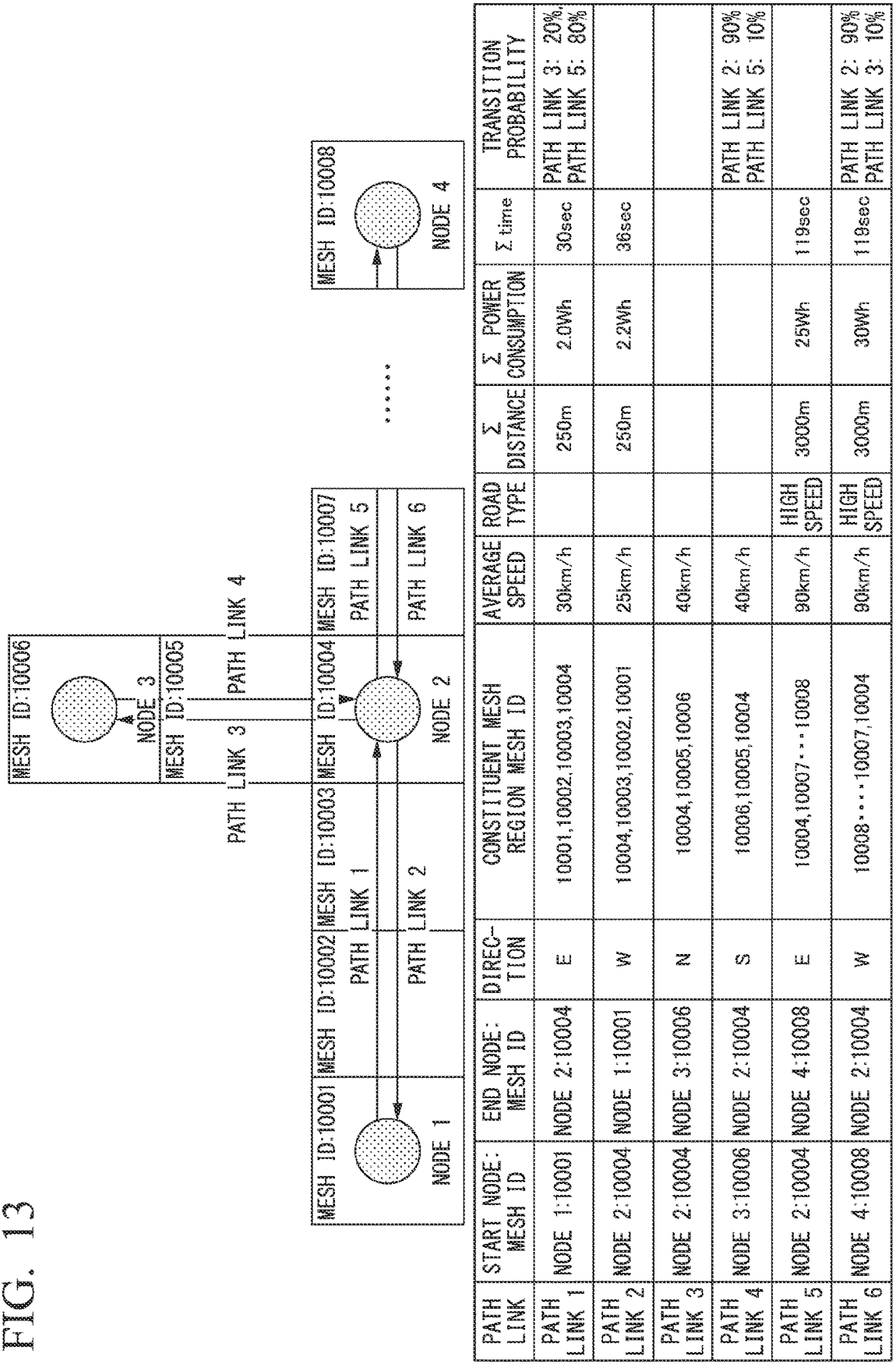
FIG. 13 shows an example of a database of graph structure generated by the information generator.

FIG. 13 shows an example of a database of graph structure generated by the information generator 130 using mesh information based on the manner of transition between meshes classified as a link or a node. The information generator 130 collectively sets regions to which a mesh region classified as a link is adjacent as a path link, and records, for each path link, the mesh id of a mesh region determined to be a node (start node) serving as a start point of the path link, the mesh id of a mesh region determined to be a node (end node) serving as an end point of the path link, and the mesh id of a mesh region (constituent mesh region) constituting the path link. Further, the information generator 130 may record the direction (direction) of movement of the vehicle M from the start node to the end node, the average speed, and the transition probability indicating which path link the vehicle M that has traveled through the path link will travel through next (or if it is possible to travel through multiple path links, the transition probability for each path link). Further, the database of graph structure may record the road type (such as highway or general road) of a path link. The database of graph structure may be recorded as mesh information associated with the mesh id of at least one or all the mesh regions constituting the path link after being generated as the database of graph structure. In the path link 1 of FIG. 13, the mesh region of the mesh id 10001 is a start node, the mesh region of the mesh id 10004 is an end node, the mesh regions of the mesh id 10001, 10002, 10003, and 10004 are included, the direction is east, and the probability of transitioning to the path link 3 is 20% and the probability of transitioning to the path link 5 is 80% for the vehicle M that has passed through the path link 1. Such information is recorded as mesh information of the mesh id_10001 to 10004.

The information provider 150 provides information in the following manner based on information generated and recorded as mesh information by the information generator 130 in accordance with the database of graph structure illustrated in FIG. 13. Specifically, the information provider 150 determines that the vehicle M traveling through the path link 1 is more likely to move to the path link 5, and provides information (for example, information based on the fact that the path link 5 is a high way and the power consumption of the path link 5 is 25 wh) associated with the path link 5 when the vehicle M is traveling through the path link 1.

In the example of FIG. 12 described above, the information provider 150 provides information based on the details of records stored in the mesh information table 166 of FIG. 5. That is, when the host vehicle M has transmitted uploaded information in a certain mesh region once, the information provider 150 provides information on the mesh region. However, provision of information based on the uploaded information transmitted once may have low accuracy. Thus, the information generator 130 may store information indicating the number of times of passage of each mesh region into the mesh information table 166, and periodically delete information on a mesh region for which the number of times of passage of is smaller than a reference value or delete the mesh region itself. Alternatively, the information provider 150 may provide information to the host vehicle M only for a mesh region for which the number of times of passage of is equal to or larger than the reference value. In this manner, it is possible to provide accurate information while managing information for each mesh region at a low load.

According to this embodiment described above, graph structure is created based on the mesh id acquired from latitude/longitude information of the host vehicle M, a road in which the host vehicle M is currently traveling is identified as a mesh region associated with a mesh id, information indicating that the host vehicle M has travelled through the mesh region is recorded as mesh information, and after that, when the host vehicle M travels through the same mesh region, information on an appropriate traveling method is provided based on the mesh information. That is, it is possible to manage information for each mesh region delimited by a contour line at a low load without managing complex information such as a map.

The embodiment described above can be represented in the following manner.

An information management device, including a storage medium storing a computer-readable instruction and a processor coupled to the storage medium, the processor executing the computer-readable instruction to:

acquire, from a mobile object, uploaded information associated with position information on the mobile object;

generate mesh information based on the uploaded information; and store the mesh information into a storage in association with a mesh region including the position information on the mobile object among a plurality of mesh regions defined so as to delimit a ground region.

This concludes the description of the embodiment for carrying out the present invention. The present invention is not limited to the embodiment in any manner, and various kinds of modifications and replacements can be made within a range that does not depart from the gist of the present invention.

What is claimed is:

1. An information management device, comprising a storage medium storing a computer-readable instruction and a processor coupled to the storage medium, the processor executing the computer-readable instruction to:

acquire, from a mobile object, uploaded information associated with position information on the mobile object;

generate mesh information based on the uploaded information; and store the mesh information into a storage in association with a mesh region including the position information on the mobile object among a plurality of mesh regions defined so as to delimit a ground region, wherein when a first mesh region including the position information corresponding to the uploaded information of a first sampling time and a second mesh region including the position information corresponding to the uploaded information of a second sampling time are different from each other, and the first mesh region and the second mesh region are not adjacent to each other, the processor identifies a third mesh region different from the first mesh region and the second mesh region, which has been passed by the mobile object between the first sampling time and the second sampling time, based on whether or not a line segment connecting the position information corresponding to the first sampling time and the position information corresponding to the second sampling time intersects with each contour line in the first mesh region and whether or not the line segment intersects with a contour line in the second mesh region, and wherein the processor distributes details of the uploaded information corresponding to the second sampling time into the first mesh region, the second mesh region, and the third mesh region proportionally, and generates the mesh information associated with the first mesh region, the mesh information associated with the second mesh region, and the mesh information associated with the third mesh region.

2. The information management device according to claim 1, wherein the uploaded information is information representing an event between sampling times in the mobile object, and wherein when a first mesh region including position information corresponding to uploaded information of a first sampling time and a second mesh region including position information corresponding to uploaded information of the second sampling time subsequent to the first sampling time are different from each other, the processor distributes details of the uploaded information corresponding to the second sampling time into the first mesh region and the second mesh region proportionally, and generates the mesh information associated with the first mesh region and the mesh information associated with the second mesh region.

3. The information management device according to claim 1, wherein the processor classifies each of the plurality of mesh regions into at least one of a first type of mesh region, which is adjacent to other two mesh regions, and a second type of mesh region, which is adjacent to other one or three or more mesh regions, based on connection among pieces of position information associated with the uploaded information, wherein the processor identifies, preferentially for the first type of mesh region, a third mesh region different from the first mesh region and the second mesh region, which has been passed by the mobile object between the first sampling time and the second sampling time, based on whether or not a line segment connecting the position information corresponding to the first sampling time and the position information corresponding to the second sampling time intersects with each contour line in the first mesh region and whether or not the line segment intersects with the contour line in the second mesh region in a case where the first mesh region including the position information corresponding to the uploaded information at the first sampling time and the second mesh region including the position information corresponding to the uploaded information at the second sampling time are different from each other and the first mesh region and the second mesh region are not adjacent to each other, and wherein the processor distributes the details of the uploaded information corresponding to the second sampling time into the first mesh region, the second mesh region, and the third mesh region proportionally, and generates the mesh information associated with the first mesh region, the mesh information associated with the second mesh region, and the mesh information associated with the third mesh region.

4. The information management device according to claim 1, wherein the processor generates the mesh information including a part or all of a movement direction, a movement distance, details of an acceleration/deceleration operation, a shift position, and power consumption of the mobile object.

5. The information management device according to claim 1, wherein the processor provides information to a user in the mesh region including the position information on the mobile object based on the mesh information corresponding to the mesh region.

6. The information management device according to claim 5,
    wherein the processor generates the mesh information including a movement direction of the mobile object, and
    wherein the processor predicts a path of the mobile object from the movement direction of the mobile object included in the mesh information, and provides information to the user based on the path of the mobile object.

7. An information management device, comprising a storage medium storing a computer-readable instruction and a processor coupled to the storage medium, the processor executing the computer-readable instruction to:
    acquire, from a mobile object, uploaded information associated with position information on the mobile object;
    generate mesh information based on the uploaded information; and
    store the mesh information into a storage in association with a mesh region including the position information on the mobile object among a plurality of mesh regions defined so as to delimit a ground region,
    wherein the processor generates the mesh information including a number of times of passage of the mobile object, and deletes at least one of: the mesh region or the mesh information for which the number of times of passage of the mobile object does not satisfy a criterion.

8. The information management device according to claim 7,
    wherein the processor provides information to a user in the mesh region including the position information on the mobile object based on the mesh information corresponding to the mesh region, and
    wherein the processor provides the user with information that recommends the mesh region for which the number of times of passage of the mobile object satisfies the criterion.

9. An information management method to be executed by a computer, the information management method comprising:
    acquiring, from a mobile object, uploaded information associated with position information on the mobile object;
    generating mesh information based on the uploaded information; and
    storing the mesh information into a storage in association with a mesh region including the position information on the mobile object among a plurality of mesh regions defined so as to delimit a ground region,
    wherein when a first mesh region including the position information corresponding to the uploaded information of a first sampling time and a second mesh region including the position information corresponding to the uploaded information of a second sampling time are different from each other, and the first mesh region and the second mesh region are not adjacent to each other, the information management method further comprises identifying a third mesh region different from the first mesh region and the second mesh region, which has been passed by the mobile object between the first sampling time and the second sampling time, based on whether or not a line segment connecting the position information corresponding to the first sampling time and the position information corresponding to the second sampling time intersects with each contour line in the first mesh region and whether or not the line segment intersects with a contour line in the second mesh region, and
    wherein the information management method further comprises distributing details of the uploaded information corresponding to the second sampling time into the first mesh region, the second mesh region, and the third mesh region proportionally, and generates the mesh information associated with the first mesh region, the mesh information associated with the second mesh region, and the mesh information associated with the third mesh region.

10. A non-transitory computer-readable storage medium having stored thereon a program for causing a computer to:
    acquire, from a mobile object, uploaded information associated with position information on the mobile object;
    generate mesh information based on the uploaded information; and
    store the mesh information into a storage in association with a mesh region including the position information on the mobile object among a plurality of mesh regions defined so as to delimit a ground region,
    wherein when a first mesh region including the position information corresponding to the uploaded information of a first sampling time and a second mesh region including the position information corresponding to the uploaded information of a second sampling time are different from each other, and the first mesh region and the second mesh region are not adjacent to each other, the computer further identifies a third mesh region different from the first mesh region and the second mesh region, which has been passed by the mobile object between the first sampling time and the second sampling time, based on whether or not a line segment connecting the position information corresponding to the first sampling time and the position information corresponding to the second sampling time intersects with each contour line in the first mesh region and whether or not the line segment intersects with a contour line in the second mesh region, and
    wherein the computer distributes details of the uploaded information corresponding to the second sampling time into the first mesh region, the second mesh region, and the third mesh region proportionally, and generates the mesh information associated with the first mesh region, the mesh information associated with the second mesh region, and the mesh information associated with the third mesh region.

* * * * *